(12) United States Patent
Raghavan

(10) Patent No.: US 8,854,000 B2
(45) Date of Patent: Oct. 7, 2014

(54) RAPID ENERGY RECHARGE SYSTEM FOR A BATTERY ELECTRIC VEHICLE

(75) Inventor: Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 786 days.

(21) Appl. No.: 13/150,472

(22) Filed: Jun. 1, 2011

(65) Prior Publication Data

US 2012/0306442 A1    Dec. 6, 2012

(51) Int. Cl.
*H02J 7/00* (2006.01)
*B60K 6/20* (2007.10)
*H02J 15/00* (2006.01)

(52) U.S. Cl.
CPC .......... *H02J 7/00* (2013.01); *H02J 15/003* (2013.01); *H02J 15/006* (2013.01)
USPC ........................ 320/109; 180/65.21

(58) Field of Classification Search
USPC ......................... 320/109; 180/65.21
See application file for complete search history.

(56) References Cited

U.S. PATENT DOCUMENTS

| 5,670,860 | A  | * | 9/1997 | Conrady et al. | 320/109 |
| 7,389,839 | B2 | * | 6/2008 | Meaney, Jr. | 180/65.265 |
| 8,266,075 | B2 | * | 9/2012 | Ambrosio et al. | 705/412 |
| 8,736,225 | B2 | * | 5/2014 | Chen et al. | 320/104 |
| 2011/0010043 | A1 | * | 1/2011 | Lafky | 701/33 |

* cited by examiner

*Primary Examiner* — M'Baye Diao

(57) ABSTRACT

A charging system is provided for an electric vehicle. A vehicle battery stores electrical energy used to drive the electric vehicle. A refillable storage device is carried by the vehicle for storing compressed fluid from an off-vehicle supply of compressed fluid. An expander is in fluid communication with the refillable storage device. The expander selectively receives the compressed fluid from the refillable storage device when the vehicle battery is in need of charging and generates a rotational energy in response to the compressed fluid flowing through the expander. A generator is rotationally coupled to the expander and electrically coupled to the vehicle battery for converting the rotational energy into electrical energy that is transferred to and stored by the vehicle battery.

20 Claims, 1 Drawing Sheet

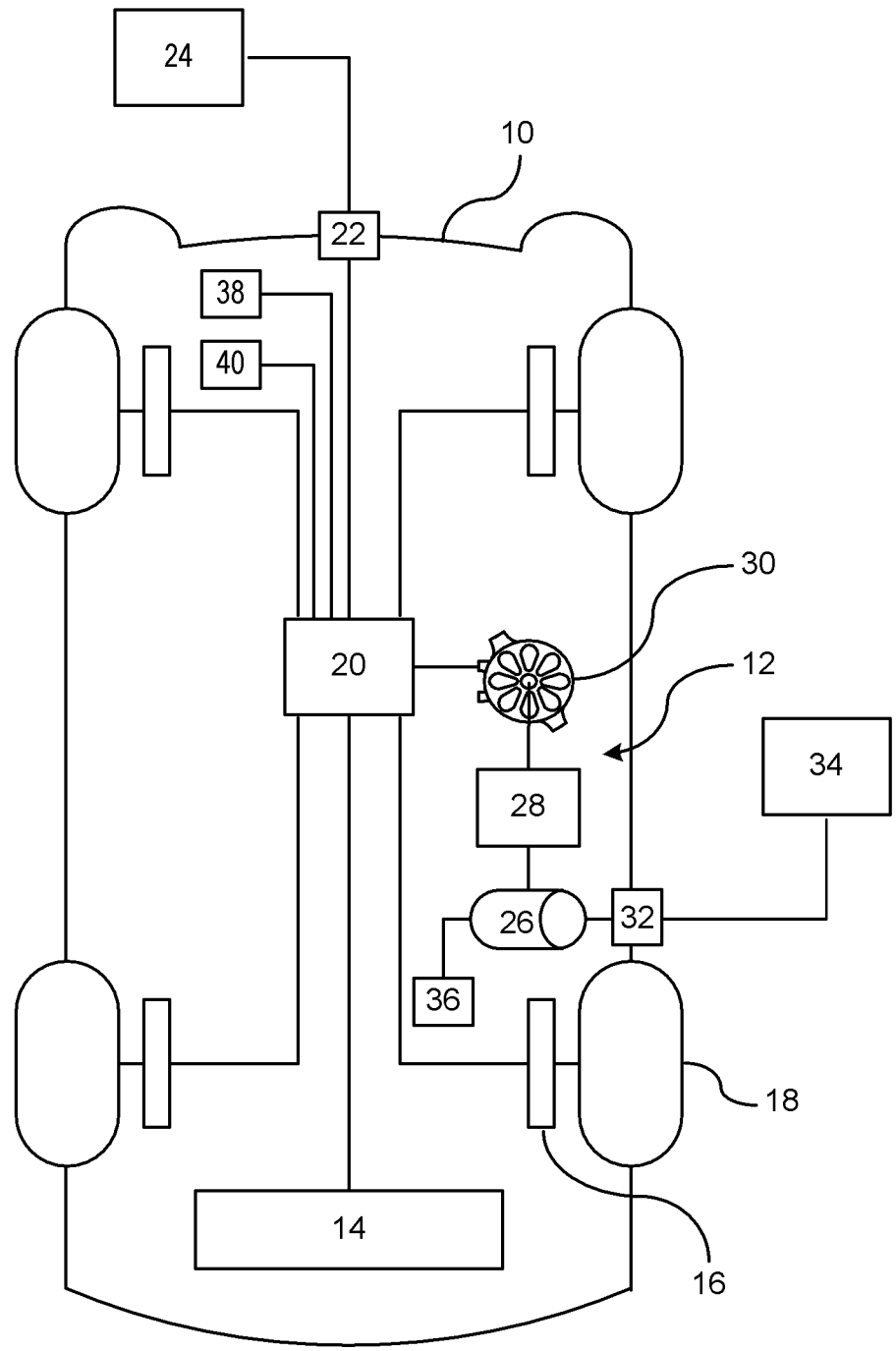

RAPID ENERGY RECHARGE SYSTEM FOR A BATTERY ELECTRIC VEHICLE

BACKGROUND OF INVENTION

An embodiment relates generally to recharging systems for an electric vehicle.

A fully electric vehicle is a type of vehicle that utilizes energy stored within a rechargeable battery pack to provide power to electric motors within the vehicle for applying motion to the vehicle. The electric vehicle typically includes an electrical power distribution system for distributing electrical energy from the vehicle battery to one or more electric motors via one or more controllers. The electric motors provide rotational torque to the wheels of the vehicle. Unlike a conventional vehicle, the electric vehicle does not utilize a combustion engine, and therefore, does not utilize convention fuel (e.g., gasoline) which is conveniently available over a vehicle's course of travel to a destination.

Fully electric vehicles require an external electrical power source from the vehicle for recharging the vehicle battery. The external electrical power source may include a 110 VAC power source or higher. An electrical conduit is used to couple the external electrical power source to a receiving port on the vehicle for receiving electrical energy required for charging the vehicle battery. The external electrical power source is a fixed source and cannot be coupled to the vehicle while the vehicle is moving. Typically a user of an electric vehicle will have a recharging port (i.e., exterior electrical power source) for recharging the battery prior to departure of the vehicle's home. When driving the electric vehicle, designated locations with exterior electrical power sources must be readily identified for recharging the vehicle battery if an insufficient amount of electrical energy is available in the vehicle battery for making a making a return trip home. Therefore, the user must account for how far the vehicle can be driven before the battery is drained prior to returning home or must account for whether a destination has an external electrical power source that can be used to recharge the vehicle battery.

In contrast to internal combustion engine vehicles that have an abundance of refueling stations along a route, the lack of exterior electrical power sources away from the user's house does not offer the freedom of travel to destinations where the vehicle may not have enough power to return home. Moreover, even if a location along the traveled route of the destination has a refueling station, recharging the vehicle battery from an exterior electrical power source is time consuming, and therefore, the user of the electric vehicle must allocate the necessary amount of time for the electric vehicle to be recharged by the exterior electrical power source since the electric vehicle must remain coupled to the exterior electrical power source during the recharging of the vehicle battery.

SUMMARY OF INVENTION

An advantage of an embodiment is a self contained auxiliary recharging system that is disposed within the vehicle and can be selectively activated by the user or automatically whenever necessary. The auxiliary recharging system utilizes compressed fluid that is stored within a refillable storage device in the vehicle. The compressed fluid is converted to electrical energy utilizing an expander and generator. The recharging system is auxiliary in the sense that the system is used when an exterior electrical power source is not available and the battery requires recharging. By utilizing a compressed fluid such as compressed air, the refillable storage device can be filled prior to departure to a destination. In addition, the recharging of the vehicle battery utilizing the compressed fluid offers a rapid recharging of the vehicle battery in comparison to recharging the vehicle battery utilizing an exterior electrical power supply, and does not require an external connection to an external power source when recharging of the battery is occurring.

The compressed air may be available at a filling station where the compressor creating the pressurized air (or other preferred gas) is powered entirely by renewable energy (like solar power or wind energy) or by conventional automotive fuels (like gasoline, diesel) or by alternative fuels (like ethanol, butanol, CNG, LPG, etc.).

An embodiment contemplates a charging system for an electric vehicle. A vehicle battery stores electrical energy used to drive the electric vehicle. A refillable storage device is carried by the vehicle for storing compressed fluid from an off-vehicle supply of compressed fluid. An expander is in fluid communication with the refillable storage device. The expander selectively receives the compressed fluid from the refillable storage device when the vehicle battery is in need of charging and generates a rotational energy in response to the compressed fluid flowing through the expander. A generator is rotationally coupled to the expander and electrically coupled to the vehicle battery for converting the rotational energy into electrical energy that is transferred to and stored by the vehicle battery.

BRIEF DESCRIPTION OF DRAWINGS

FIG. 1 is a schematic of an electric vehicle illustrating an auxiliary vehicle battery recharging system.

DETAILED DESCRIPTION

There is shown in FIG. 1 an electric vehicle 10 that includes an auxiliary charging system 12 for charging a vehicle battery 14. The electric vehicle 10 typically includes one or more electric motors 16 that are powered by the vehicle battery 14. The electric motors 16 apply a rotational torque to the wheels 18 of the electrical vehicle. The amount of energy distributed to the electric motors 16 from the vehicle battery 14 is managed by a controller 20.

The term "electric vehicle" as used herein is meant to be inclusive of battery electric vehicles (BEV) and plug-in hybrid electric vehicles (PHEV). An electric vehicle is commonly referred to as a vehicle that has off-vehicle charge capability. A primary charging system for the vehicle battery 14 includes an electrical charging port 22 that is coupled to an off-vehicle electrical power source 24 for charging the vehicle battery 14 when the vehicle is not being driven. The off-vehicle power source 24 is typically a 110 VAC or 220 VAC power source. The electric vehicle 10 is typically recharged at a driver's domicile or other location where a respective off-vehicle electrical power source is available. However, off-vehicle electrical power sources are not commonly available at various locations that a vehicle may travel to. This becomes problematic if the energy currently available in the vehicle battery 14 is insufficient to power the electric vehicle 10 to a known recharging location, and more so, a known recharging location that is of convenience to the user of the electric vehicle 10 since recharging the vehicle using the electrical power source is time consuming.

The auxiliary charging system 12 provides a secondary charging apparatus that can charge the vehicle without having to couple to an off-vehicle electric power source while the vehicle battery 14 recharges. The auxiliary charging system 12 includes a refillable storage device 26, an expander 28, and a generator 30.

The refillable storage device 26 is disposed within the vehicle and is carried by the vehicle as vehicle travels between locations. The refillable storage device 26 stores a compressed fluid that is selectively used to generate electrical energy for recharging the vehicle battery 14. The compressed fluid is preferably a compressed gas that includes, but is not limited to, compressed air, hydrogen, or nitrogen.

An adapter 32 is coupled to the refillable storage device 26. The adapter 32 may include a compression fitting that is selectively adaptable to an off-board supply of compressed fluid 34. The adapter 32 enables compressed fluid to be transferred to the refillable storage device 26 by the external off-vehicle supply of compressed fluid 34. The off-vehicle supply of compressed fluid 20 may be a compressor or similar device for generating or storing the compressed fluid that may be transferred to the electric vehicle 10. The compressed air may be available at a filling station where a compressor creates the pressurized air (or other preferred gas). The compressor is powered by conventional energy sources (e.g., electrical grid, gasoline, diesel) or possibly by renewable energy (like solar power or wind energy) or by alternative fuels (like ethanol, butanol, CNG, LPG, etc.). The nominal pressure that is stored within the refillable storage device 26 is stored preferably at 300 bar. Alternatively, the nominal pressure may be higher or lower than 300 bar. Moreover, users of the electric vehicle 10 having a compressor at their domicile that may provide compressed fluid within the refillable storage device 26 may plan ahead and fill the refillable storage device 26 prior to departure to a respective travel destination as the compressed fluid within the refillable storage device is typically used at a later time to recharge the battery. That is, the compressed air is carried by the vehicle until a time when the user of the electric vehicle 10 selectively initiates recharging of the vehicle battery 14 using the compressed air. Moreover, the refillable storage device 26 may be rapidly refilled. Therefore, the time required to fill the refillable storage device is minimal in comparison to the time the vehicle would require to be coupled to an off-vehicle electric power supply for accumulating a sufficient amount of energy to recharge the vehicle battery.

An indicator gauge 36 may be coupled to the refillable storage device 16 for indicating pressure and/or the amount of compressed fluid stored within the refillable storage device 26 so that the user of the electric vehicle 10 may determine whether the refillable storage device 26 requires refilling prior to departure to a next destination. The indicator gauge 36 may be disposed anywhere within the vehicle, but is preferably located as part of an instrument panel of a vehicle for display to the user of the electric vehicle.

The refillable storage device 26 is fluidically coupled to an expander 28. The expander 28 is preferably a high efficiency expander. The expander 28 may include, but is not limited to, a turbo-expander or an expansion turbine that uses a centrifugal or axial flow turbine in which a high pressure gas is expanded to produce work that is used to drive a generator 30. The expander 28 receives the compressed fluid from the refillable storage device 26 and generates work in the form of rotational energy in response to the compressed fluid flowing through the expander 28.

The expander 28 is coupled to a generator 30 for producing electrical energy. The rotational energy generated by the expander 28 rotationally drives the generator 30 for converting the rotational energy into an electrical energy.

The electrical energy produced by the generator 26 is transferred to the vehicle battery 14 via the controller 20 and is stored within the vehicle battery 14. The controller 20 determines the charge rate of electrical energy that is supplied to the vehicle battery 14. The controller may be a battery control module or may be a power distribution module. It should be also understood that the electrical energy produced by the generator 30 may be supplied directly to the electric motors 16 wherein the controller 20 would determine the distribution of electrical energy to each of the electric motors 16. The auxiliary charging system 12 allows a user to selectively recharge the vehicle battery 14 when the amount of energy currently remaining in the vehicle battery 14 is below an insufficient level to travel to a destination with a known off-vehicle electric power source. As a result, once the refillable storage device is filled, the auxiliary charging system 12 becomes a self-contained charging system that requires no external connections or exterior power for recharging the vehicle battery 14.

The auxiliary charging system 12 may further include a battery monitoring device 38 that monitors the energy level of the vehicle battery 14. The battery monitoring device 38 may be may be integrated as part of the battery control module used to control charging of the vehicle battery or may be a standalone device in communication with the battery control module. It should also be understood that the various control functions for controlling battery charging, energy distribution to the wheels, and monitoring of the charge level may be integrated into a single control unit such as the controller 20. The battery monitoring device detects a low charge for automatic activation of the auxiliary charging system 12. That is, when the charge level of the vehicle battery 14 is below a respective level (e.g., predetermined threshold), the battery monitoring device 38 may automatically activate the auxiliary charging system 12 for recharging the vehicle battery 14 via the compressed air. Moreover, the electric vehicle 10 may further include a manual activation switch 40 which allows the user of the electric vehicle 10 to override the automatic activation. In this manner, the user might have reasons for not automatically recharging the vehicle battery 10 via the auxiliary charging system 12, if for example, the electric vehicle is close to a location where the vehicle battery can recharged using the off-vehicle electrical power source.

While certain embodiments of the present invention have been described in detail, those familiar with the art to which this invention relates will recognize various auxiliary designs and embodiments for practicing the invention as defined by the following claims.

What is claimed is:

1. A charging system for an electric vehicle, the charging system comprising:
    a vehicle battery for storing electrical energy used to drive the electric vehicle;
    a refillable storage device carried by the vehicle for storing compressed fluid from an off-vehicle supply of compressed fluid;
    an expander in fluid communication with the refillable storage device, wherein the expander selectably receives the compressed fluid from the refillable storage device and generates a rotational energy in response to the compressed fluid flowing through the expander; and
    a generator rotationally coupled to the expander and electrically coupled to the vehicle battery for converting the rotational energy into electrical energy that is transferred to and stored by the vehicle battery.

2. The charging system of claim 1 further comprising an adapter for fluidically coupling the refillable storage device to the off-vehicle supply of compressed fluid.

3. The charging system of claim 1 wherein the compressed fluid includes a compressed gas.

4. The charging system of claim 3 wherein the compressed gas is compressed air.

5. The charging system of claim 3 wherein the compressed gas is hydrogen.

6. The charging system of claim 3 wherein the compressed gas is nitrogen.

7. The charging system of claim 1 further comprising an electrical adapter for coupling the electric vehicle to an off-vehicle electrical power source for charging the vehicle battery.

8. The charging system of claim 1 further comprising an indicator gauge for identifying an amount of compressed fluid stored within the refillable storage device.

9. The charging system of claim 1 wherein the expander is preferably a high efficiency expander.

10. The charging system of claim 1 further comprising a controller for transferring the electrical energy produced by the generator to the vehicle battery.

11. The charging system of claim 10 wherein the controller determines the charge rate of electrical energy that is supplied to the vehicle battery.

12. The charging system of claim 10 wherein the controller is a battery control module.

13. The charging system of claim 12 wherein the controller is a power distribution module.

14. The charging system of claim 12 wherein the battery control module is a monitoring device for determining a charge level of the battery.

15. The charging system of claim 12 wherein the battery control module automatically activates recharging of the vehicle battery using the electrical energy generated via the compressed fluid.

16. The charging system of claim 12 further comprising an activation switch for allowing a user to selectably control between manual activating a recharging of the vehicle battery or an automatic activation of the recharging of the vehicle battery.

17. The charging system of claim 16 wherein manual activation allows the user to control select when vehicle battery recharging is activated.

18. The charging system of claim 16 wherein automatic activation initiates recharging of the vehicle battery when the battery control module detects a charge level of the vehicle battery below a predetermined threshold.

19. The charging system of claim 1 wherein the generator is coupled to an electric motor that drives the electric vehicle, wherein the generator supplies electrical energy directly to the electric motor.

20. The charging system of claim 19 further comprising a controller for controlling the transfer of the electrical energy produced by the generator to the electric motor.

* * * * *